United States Patent [19]

Sheperd

[11] 4,390,478
[45] Jun. 28, 1983

[54] SPRAYING APPARATUS FOR WATER COOLING TOWER

[75] Inventor: Charles E. Sheperd, Houston, Tex.

[73] Assignee: C. E. Shepherd Company, Inc., Houston, Tex.

[21] Appl. No.: 262,990

[22] Filed: May 12, 1981

[51] Int. Cl.³ .............................................. B01D 47/08
[52] U.S. Cl. ........................................ 261/6; 261/111; 261/DIG. 11; 261/112; 239/500; 239/600
[58] Field of Search ............... 239/500, 391, 462, 600, 239/550, 553.3, 396; 261/5, 6, 111, DIG. 11

[56] References Cited

U.S. PATENT DOCUMENTS

| | | | |
|---|---|---|---|
| 98,257 | 12/1869 | Harris | 239/396 |
| 870,924 | 11/1907 | Attlesey | 239/391 |
| 2,973,905 | 3/1961 | Ackley | 239/462 |
| 3,061,204 | 10/1962 | Mac Innes et al. | 239/500 |
| 3,617,036 | 11/1971 | Brown | 261/DIG. 11 X |
| 4,176,794 | 12/1979 | Allenbaugh, Jr. | 239/500 X |

Primary Examiner—John J. Love
Assistant Examiner—Mary McCarthy
Attorney, Agent, or Firm—Schwartz, Jeffery, Schwaab, Mack, Blumenthal & Koch

[57] ABSTRACT

The apparatus includes a spray nozzle having an orifice plate leading to a vertically oriented opening for directing liquid onto a dispersion plate which is disposed below. The dispersion plate is frusto-conically shaped and has a fluted outer periphery for breaking the liquid up into droplets. A central aperture is formed in the dispersion plate leading to a conical dispersion element which has raised projections on its surface for breaking liquid up into droplets. A filter screen can be removably mounted over the top of the orifice plate for filtering debris or the like prior to its entering the nozzle. The apparatus is especially adapted for use in cross flow water cooling towers.

12 Claims, 5 Drawing Figures

SPRAYING APPARATUS FOR WATER COOLING TOWER

BACKGROUND OF THE INVENTION

1. Field of the Invention

This invention relates to liquid spray devices for use in gas and liquid contact apparatus, and esspecially to such spray devices adapted for use in water cooling towers wherein water is distributed over the top of fill elements. The liquid flows downwardly over the fill elements to be cooled by a cross or countercurrent flow of gas, such as air.

2. Discussion of Related Art

In gas and liquid contact apparatus, such as a cooling tower used for reducing the temperature of cooling water from processing plants, for example, fill elements are disposed within a housing in which there is developed a crosscurrent or countercurrent flow of air. The water to be cooled is sprayed on to the fill elements from above. In order to provide maximum contact time between the water and air and thus maximum efficiency and cooling effect, it is essential that the water be dispersed evenly over the fill elements and flow smoothly down the fill elements.

Constructions have been suggested wherein a plurality of nozzles are fed by a liquid distribution network. The nozzles are disposed over areas of fill elements and are designed to cover the specified area with liquid. Such a system is shown in U.S. Pat. No. 3,533,560 to George W. Meek. However, the nozzles used in systems exemplified by the Meek patent concentrate on applying a sheet of water to the fill elements. It has been found that water applied in sheets does not produce flow characteristics necessary for efficient cooling.

Consequently, a need has arisen for a spray apparatus which can produce a more uniform and effective distribution of liquid onto fill elements in a cooling tower.

SUMMARY OF THE INVENTION

One object of the present invention is to provide a spray apparatus which will spray liquid in the form of droplets in a uniform pattern over a predetermined area.

A further object of the present invention is to provide a spray apparatus which is adapted for use in present cooling tower constructions.

Another object of the present invention is to provide a spray apparatus which is relatively strong and durable in use yet economical to manufacture.

Yet another object of the present invention is to provide a spray apparatus which includes a screen for filtering debris which may clog the spray apparatus.

Another object of the present invention is to provide a spray apparatus having a screen which can be removed easily to allow the apparatus to be cleaned.

An additional object of the present invention is to provide a spray apparatus in which the rate of liquid flow can be adjusted.

In accordance with the above and other objects, the present invention comprises a nozzle having a vertically oriented body having a longitudinal opening passing therethrough. A dispersion plate is disposed below the body in spaced relation thereto. The dispersion plate has an outer periphery provided with means for disrupting a flow of liquid passing thereover, in the form of a fluted edge. An aperture is formed in the center of the dispersion plate below the opening and a secondary dispersion surface is disposed below the aperture. The secondary dispersion surface has means formed thereon for disrupting the flow of liquid. The secondary dispersion surface is the outer surface of a conical member and the means for disrupting liquid flow is preferably in the form of raised projections formed on the conical member. Each of the raised projections has a substantially planar top surface facing upwardly toward the aperture.

A recess is formed in the top of the body around the opening. An orifice plate in the form of a ring snaps into the recess. The center of the orifice plate acts as an orifice leading to the vertical opening. The orifice plate, and thus the size of the orifice, can easily be changed to adjust the flow rate through the nozzle.

The dispersion plate is frusto-conically shaped. Accordingly, any water which strikes the dispersion plate is propelled radially outward. The fluting of the dispersion plate is accomplished by means of vertically oriented grooves which present varying radii to water flowing over the dispersion plate. Accordingly, the water is allowed to fall from the dispersion plate at various radially spaced positions and is broken up into droplets as well as evenly dispersed over a wide area. Similarly, since water which falls through the aperture in the dispersion plate impinges upon a conical element, it too is dispersed radially. Water flowing over the surface of the conical element strikes the projections formed thereon and is also broken into droplets.

A filter screen is provided for filtering debris from the orifice plate to prevent clogging thereof. The screen is in the form of a vertically oriented cylindrical cage having an enclosed top and an open bottom. A plurality of hooks extend upwardly from the nozzle body and engage a ring at the bottom of the screen for holding the screen and the nozzle in close agreement.

BRIEF DESCRIPTION OF THE APPLICATION DRAWINGS

DETAILED DESCRIPTION OF THE PREFERRED EMBODIMENT

Figure 1:
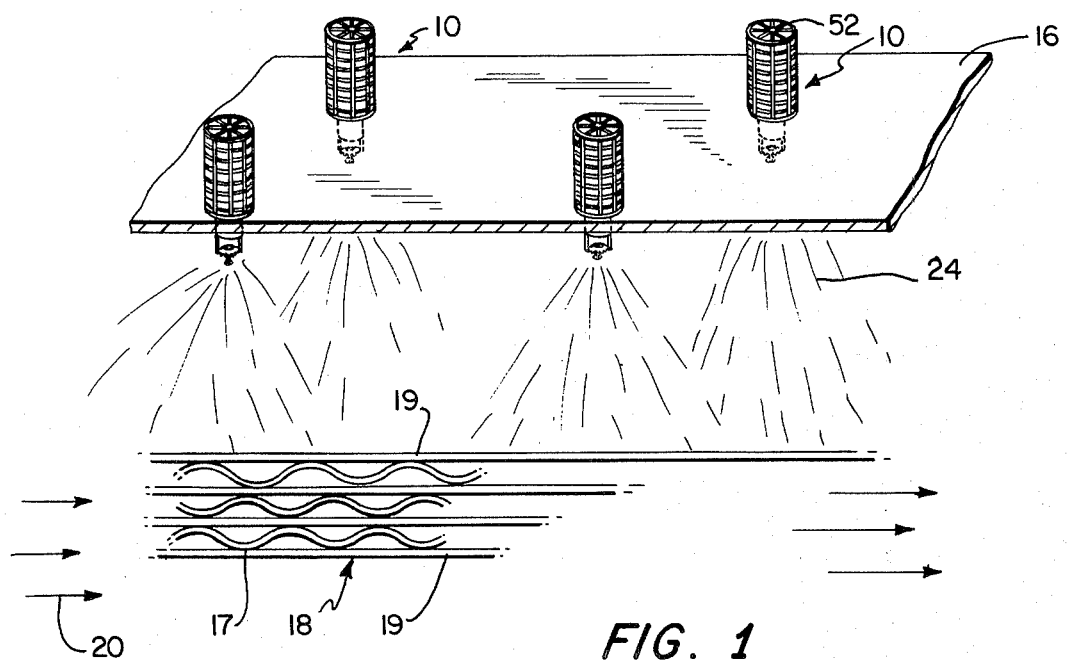
FIG. 1 is a perspective view of a portion of a cooling tower using a plurality of spray apparatuses of the present invention.

Referring to the drawings, wherein like parts are indicated by like reference numerals, the spray assemblies incorporating the principles of the present invention are generally indicated at 10. With particular reference to FIG. 1, portions of a typical cooling tower construction in which the spray assemblies 10 are mounted are shown. The cooling tower comprises a generally large casing or housing (not shown) having fill elements 18 which in the form shown include numerous corrugated sheets 17 which may be formed from asbestos or the like separated by flat sheets 19 which comprise cellular fill. However, the fill elements per se form no part of the present invention, and it will be understood that any suitable fill assembly can be used in accordance with the invention. The fill elements 18 can be supported in any suitable manner in the tower.

A wet deck or hot water pan 16 is positioned vertically above fill elements 18 and supports evenly spaced spray assemblies 10 at, for example, two to four foot centers. Hot water to be cooled flows onto pan 16 from a distribution flue, as well known in the art. Water flowing across pan 16 falls downwardly and is dispersed by the spray assemblies onto fill elements 18. Ambient air is drawn inward from the side of the cooling tower and then passes through the porous cellular fill 19 as depicted by arrows 20. Warm water sprayed from above and shown at 24 strikes porous fill 19 and passes through it. The warm water is contacted by air current 20 thereby causing the water to be cooled. The air is forced out of the cooling tower through an outlet. Cooled water is collected at the bottom of the cooling tower and is withdrawn for use by pipes and pumps (not shown). It will be understood that the invention can also be utilized with countercurrent air flow arrangements.

Figure 2:
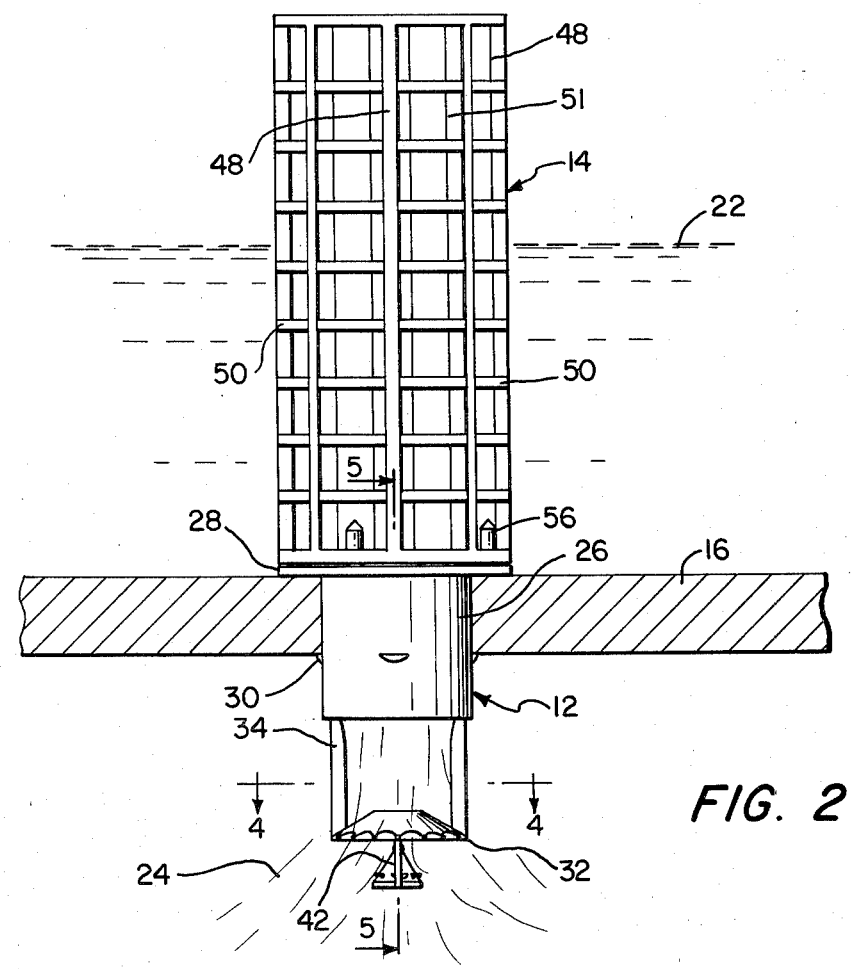
FIG. 2 is a side elevation view of the spray apparatus of the present invention.

As shown in FIG. 2, each spray assembly 10 includes a nozzle 12 and screen 14. Nozzle 12 extends downwardly through pan 16 and screen 14 is positioned above the pan. Water shown at 22 flows through the screen which filters any large debris which may clog nozzle 12. Typically, pan 16 is provided with sides having a depth of eight inches to a foot. Screen 14 extends up to approximately the top of the sides of pan 16. The level of water 22 will usually vary from about 4 to 6 inches.

Figure 3:
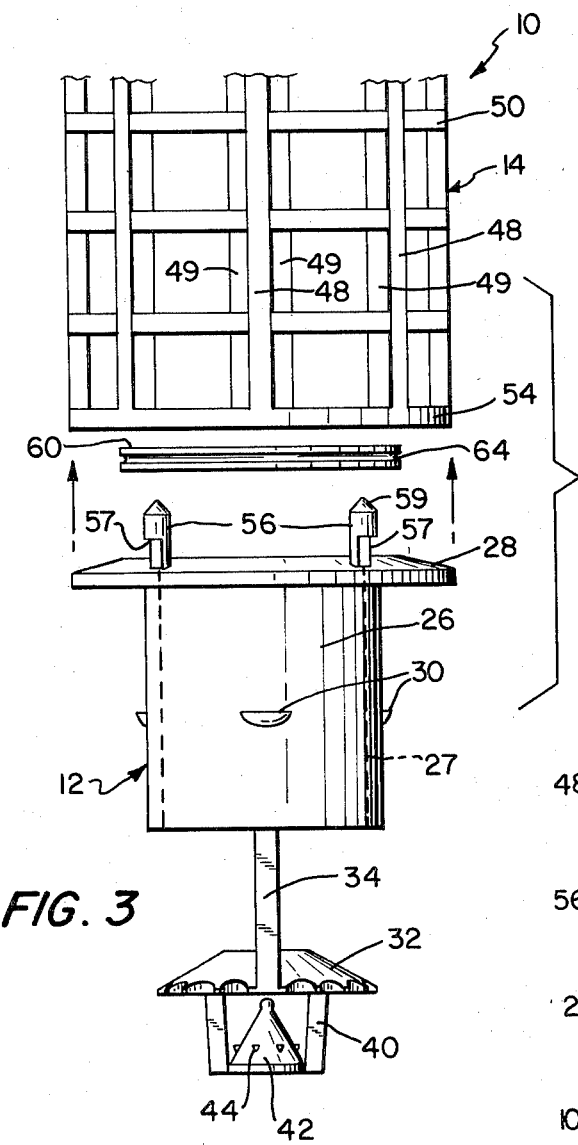
FIG. 3 is a partially fragmented exploded view showing the interconnection of a spray nozzle and screen of the present invention.
Figure 5:
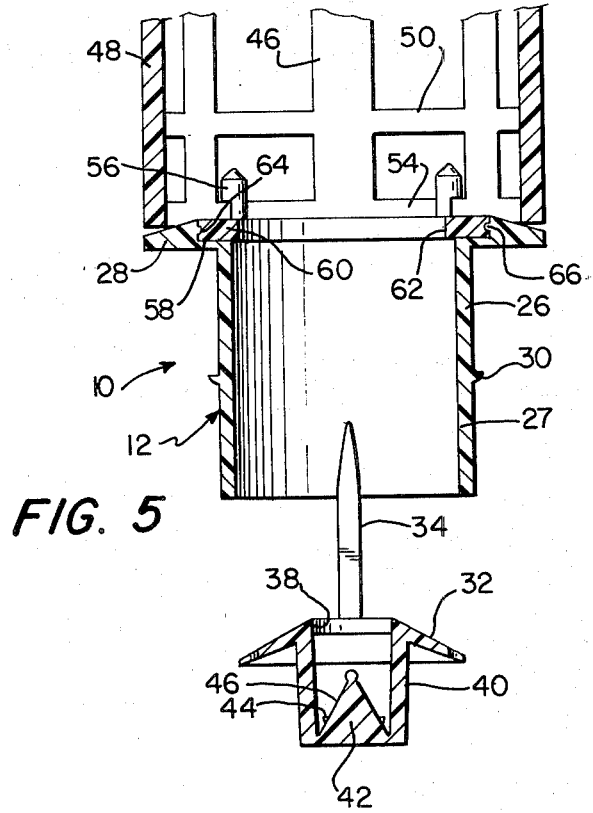
FIG. 5 is a partially fragmented sectional view taken on section line 5—5 of FIG. 2.

As shown in FIGS. 2, 3 and 5, nozzle 12 includes a mounting flange 28 which rests upon pan 16 and supports the nozzle body 26. The body 26 is generally cylindrical and defines an interior opening 27 for channeling water 22 downwardly. The outer surface of body 26 includes mounting projections 30 which are spaced from the bottom of flange 28 by a distance approximately equal to the thickness of pan 16. When nozzle 12 is forced through an appropriately sized hole cut in pan 16, projections 30 engage the bottom of pan 16 and prevent upward movement of the nozzle.

Figure 4:
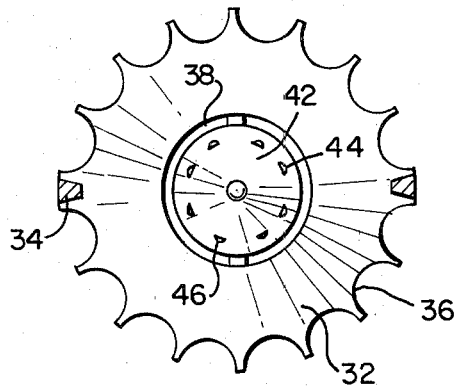
FIG. 4 is a top plan view taken along section line 4—4 of FIG. 2.

A dispersion plate 32 is held a fixed distance below the bottom body 26 by a pair of supports 34. Water passing through body 26 strikes dispersion plate 32 and is propelled radially outward. Dispersion plate 32 is shown most clearly in FIGS. 3 and 4 where it can be seen that the dispersion plate is essentially frusto-conical in shape. This particular shape forces impinging water to spread outwardly from the center of the plate towards its peripheral edge. A plurality of vertically oriented grooves 36 form fluting around the peripheral edge of dispersion plate 32 and thus present varying radii to the water as it progresses outwardly. Accordingly, the water passing over grooves 36 is broken up into droplets and dispersed evenly over the fill elements below. The number and size of grooves 36 can be varied to suit particular spray requirements. As one specific example, a dispersion plate having a base diameter of 1 7/16" has been found to work satisfactorily with a groove disposed every 20° about its circumference, with each groove having a 7/64" radius. Also, the base diameter of dispersion plate 32 should be made approximately equal to opening 27 to provide maximum droplet coverage.

An aperture 38 is formed in the center of dispersion plate 32 to allow a selective amount of water to pass through the dispersion plate to a secondary dispersion element 42. Dispersion element 42 is generally conical in shape having a base diameter which is approximately equal to the diameter of aperture 38. A pair of vertical supports 40 connect element 42 to plate 32 and maintain it at a position spaced vertically below aperture 38. The surface of element 42 is interrupted by a plurality of raised projections 44. With element 42 having a base diameter of approximately 7/16", projections 44 are preferably distributed at approximately 45° intervals about element 42. Projections 44 may be positioned at about one-third the height of element 42. Each projection 44 has a substantially planar and horizontal upper surface 46 which the downward flowing water strikes, with surface 46 being generally semicircular in shape.

Nozzle 12 may be made from any suitable synthetic resin or other corrosion resistant material. When made from synthetic resin, the nozzle can be produced using standard moulding techniques.

A recess 58 is formed in flange 28 to receive orifice plate 60. Orifice plate 60 is in the form of an annular ring having a central circular orifice 62 leading to opening 27. The size of orifice 62 controls the amount of water entering opening 27 and thus controls the flow rate of nozzle 12. Orifice plate 60 is releasably held within recess 58 by virtue of a snap lock arrangement comprising an indented annular groove 64 formed around the periphery of plate 60 and a protruding annular ring 66 formed on the inside of recess 58. The outside diameter of plate 60 is slightly less than the diameter of recess 58, allowing the plate to be received in the recess, and groove 64 and ring 66 to engage. Plate 60 is also preferably made from synthetic resin and, due to the resiliency of plate 60 and flange 28, the plate can easily be snapped in place or removed. Accordingly, the flow rate through nozzle 12 can be adjusted by replacing plate 60 with a similar plate having a different size orifice 62.

Screen 14 includes a plurality of vertical elements 48 as shown in FIGS. 2 and 3. Each element 48 tapers radially inward slightly as shown at 49 to provide rigidity to the element and to diminish, to the extent desired, the size of the openings through the screen. Elements 48 are integrally interconnected by a plurality of horizontal rings 50 which are spaced along elements 48 to produce a generally cylindrical cage. As shown in FIG. 1, the top ring of each screen is enclosed by a plurality of radially extending bars 52. The bottom of each screen is open and has a diameter approximately equal to that of flange 28 so that the screen can meet with flange 28. The distance between adjacent rings 50 and elements 48 should be such that openings 51 formed are significantly smaller than orifice 62. In this manner, any debris contained in water 22 which may be of sufficient size to clog orifice 62 will be filtered from the nozzle. This is particularly important where the cooling water comprises surface water from rivers or seas.

Screen 14 is designed to easily connect to and disconnect from nozzle 12 so that the screen and/or nozzle can be cleaned. To effect this interconnection, a plurality of upwardly extending and circumferentially spaced hook elements 56 are mounted on flange 28. Each hook element 56 has a recess 57 shown most clearly in FIG. 3. The height of recess 57 is approximately equal to the thickness of the lowest ring 54 of screen 14. The top of each hook 56 is tapered as shown at 59 such that when screen 14 is pushed down onto the hooks, the hooks will bend inward, due to the resilient nature of the material, allowing ring 54 to snap into the recesses 57.

Again with reference to FIG. 2, it will be seen that in operation, water 22 flows through orifice plate 60 and through opening 27. A portion of the water impinges upon the surface of dispersion plate 32 and a portion travels through aperture 38 and impinges upon element 42. The water which impinges upon plate 32 is directed radially outward and then broken into droplets by grooves 36, thereby distributing the water over the fill elements below. Water which impinges upon element 42 is also directed radially outward and broken into droplets by projections 44. Accordingly, a spray of water 24 is produced and formed of small droplets which are fairly evenly distributed over a large area. It should be noted that several dispersion plates 32 having progressively reduced diameters and progressively smaller apertures formed therein may be stacked vertically below one another to provide a larger area of distribution and/or a more even spray distribution, if desired.

While the present invention has been illustrated and described in its preferred form, it will be understood that variations may be made therein without departing from the scope of the invention as set forth in the appended claims.

I claim:

1. In a cooling tower having fill elements and a substantially flat wet deck positioned above said elements, a plurality of spray assemblies extending through said wet deck over said fill elements, each spray assembly comprising:
   a nozzle having a vertically oriented hollow body passing through said wet deck and having a vertical hole passing therethrough;
   a dispersion plate positioned below said hole and said wet deck at a position spaced from said body for dispersing liquid passing through said hole;
   an aperture formed in said dispersion plate below said hole;
   a secondary dispersion surface disposed below said aperture for disrupting a flow of liquid passing through said aperture;
   a generally vertical filter screen having an encircling grid-like side wall, a top wall construction and an open bottom, and said grid-like side wall having openings of a sufficient size to control debris passing to said spray nozzle by filtering out debris larger than said openings; and
   means for attaching said filter screen in a position such that said side wall surrounds said hole and said filter screen rises above the plane of said wet deck, whereby debris larger than said openings will be washed past said filter screen and not clog said filter screen.

2. The apparatus as set forth in claim 1 wherein said dispersion plate includes a plurality of grooves formed in spaced relation along the outer periphery of said dispersion plate.

3. The apparatus as set forth in claim 2 wherein said dispersion plate is frusto-conically shaped.

4. The apparatus of claim 3 wherein said secondary dispersion surface includes a plurality of raised projections.

5. The apparatus of claim 4 wherein said secondary dispersion surface is conically shaped.

6. The apparatus of claim 1 wherein said filter screen is generally cylindrical.

7. The apparatus of claim 1 wherein said attaching means includes a plurality of hooks formed at the upper end of said nozzle, and adapted to engage a mounting ring connected to said filter screen for removably connecting said screen to said nozzle.

8. The apparatus of claim 7, further including means for securing said nozzle to said wet deck, comprising a plurality of radially extending projections formed on said nozzle which engage the undersurface of said deck when said screen and nozzle are assembled.

9. The apparatus of claim 1, further including an orifice plate the inner diameter of which controls liquid flow through said opening in said nozzle, and means for removably mounting said orifice plate to said nozzle body.

10. The apparatus of claim 9 wherein said means for mounting includes a recess formed in the upper portion of said body for receiving said orifice plate, said orifice plate being formed with a peripheral groove adapted to receive an annular protrusion formed on the side wall of said recess, whereby said orifice plate can be snapped in said recess, and quickly and easily replaced by orifice plates of varying internal opening.

11. In a cooling tower having fill elements and a substantially flat wet deck positioned above said fill elements, a plurality of spray assemblies extending through said wet deck over said fill elements, each spray assembly comprising:
   a nozzle having a vertically oriented hollow body passing through said wet deck and having a vertical hole passing entirely through said hollow body;
   a dispersion plate positioned below said hole and said wet deck, said dispersion plate being spaced below said body for dispersing liquid passing through said hole;
   an aperture formed in said dispersion plate below said hole;
   a secondary dispersion surface disposed below said aperture for disrupting a flow of liquid passing through said aperture;
   an orifice plate having an inner opening the diameter of which controls liquid flow through said orifice plate; and
   means for mounting said orifice plate in said nozzle body to control the flow of liquid through said nozzle body hole, said mounting means including a recess formed in said nozzle body for holding said orifice plate above the plane of said wet deck.

12. The cooling tower of claim 11 wherein said mounting means further includes a peripheral groove formed on said orifice plate and an annular protrusion formed in said recess, whereby said orifice plate can be snapped into said recess such that said annular protrusion is received in said peripheral groove.

* * * * *